(12) United States Patent
Bailey et al.

(10) Patent No.: US 8,495,527 B2
(45) Date of Patent: Jul. 23, 2013

(54) PATTERN RECOGNITION WITH EDGE CORRECTION FOR DESIGN BASED METROLOGY

(75) Inventors: Todd C. Bailey, Poughkeepsie, NY (US); Daniel S. Fischer, Wappingers Falls, NY (US); Dongbing Shao, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/236,698

(22) Filed: Sep. 20, 2011

(65) Prior Publication Data

US 2012/0110523 A1 May 3, 2012

Related U.S. Application Data

(63) Continuation-in-part of application No. 12/914,154, filed on Oct. 28, 2010.

(51) Int. Cl.
G06F 17/50 (2006.01)

(52) U.S. Cl.
USPC ............................................. 716/53; 716/55

(58) Field of Classification Search
USPC ..................................................... 716/53, 55
See application file for complete search history.

(56) References Cited

U.S. PATENT DOCUMENTS

| | | | |
|---|---|---|---|
| 4,435,984 A | 3/1984 | Gruber | |
| 5,723,233 A * | 3/1998 | Garza et al. ....................... | 430/5 |
| 5,887,080 A | 3/1999 | Tsubusaki et al. | |
| 6,111,981 A | 8/2000 | Tsubusaki et al. | |
| 6,114,681 A | 9/2000 | Komatsu | |
| 6,462,343 B1 | 10/2002 | Choo | |
| 6,472,662 B1 | 10/2002 | Archie | |
| 6,480,807 B1 | 11/2002 | Miyano | |
| 6,570,157 B1 | 5/2003 | Singh et al. | |
| 6,799,066 B2 | 9/2004 | Steines et al. | |
| 6,873,747 B2 | 3/2005 | Askary | |
| 7,196,382 B2 | 3/2007 | Kruger et al. | |
| 7,239,908 B1 | 7/2007 | Alexander et al. | |
| 7,352,892 B2 | 4/2008 | Zhang et al. | |

(Continued)

OTHER PUBLICATIONS

Daniet Fischer et al., "OPC Model Data Collection for 45nm technology node using Automatic CD-SEM Offline Recipe Creation", Proc.of SPIE vol. 6518, 2007.

(Continued)

Primary Examiner — Stacy Whitmore
Assistant Examiner — Mohammed Alam
(74) Attorney, Agent, or Firm — Cantor Colburn LLP; Ian MacKinnon

(57) ABSTRACT

A method for edge correction in pattern recognition includes generating a pattern recognition output for a pattern recognition process, including receiving, in the processor, a design layout, receiving a sample plan based on the design layout, receiving a first user-generated edge input, generating a pattern recognition recipe output from the design layout, the sample plan and the user-generated edge input, wherein the pattern recognition recipe output is configured to drive the pattern recognition process, generating a measurement model from the pattern recognition process, generating a measurement model pattern recognition output for an measurement model pattern recognition process, including receiving a second user-generated input and generating a measurement model pattern recognition recipe output from the measurement model and the second user-generated edge input, wherein the measurement model pattern recognition recipe output configured to drive the measurement model pattern recognition process.

20 Claims, 8 Drawing Sheets

U.S. PATENT DOCUMENTS

| | | |
|---|---|---|
| 7,365,322 B2 | 4/2008 | Miyamoto et al. |
| 7,468,075 B2 | 12/2008 | Lang et al. |
| 7,507,961 B2 | 3/2009 | Toyoda et al. |
| 7,570,796 B2 | 8/2009 | Zafar et al. |
| 7,590,278 B2 | 9/2009 | Roman et al. |
| 7,599,577 B2 | 10/2009 | Ciuc et al. |
| 7,615,746 B2 | 11/2009 | Nagatomo et al. |
| 7,630,006 B2 | 12/2009 | DeLuca et al. |
| 7,646,906 B2 | 1/2010 | Saidin et al. |
| 7,668,373 B2 | 2/2010 | Mitsui |
| 7,676,077 B2 | 3/2010 | Kulkarni et al. |
| 7,689,009 B2 | 3/2010 | Corcoran et al. |
| 7,689,966 B2 | 3/2010 | Verma et al. |
| 7,705,996 B2 | 4/2010 | Kim et al. |
| 7,711,514 B2 | 5/2010 | Park et al. |
| 7,732,761 B2 | 6/2010 | Tanaka et al. |
| 7,738,093 B2 | 6/2010 | Alles et al. |
| 7,875,851 B1 | 1/2011 | Haidinyak et al. |
| 8,230,379 B2 * | 7/2012 | Kobayashi et al. ............ 716/132 |
| 2007/0061772 A1 * | 3/2007 | Ye et al. ............................ 716/21 |
| 2008/0098341 A1 * | 4/2008 | Kobayashi et al. ................ 716/9 |

OTHER PUBLICATIONS

Taehyeong Lee et al., "Hot Spot Management through Design Based Metrology-Measurement and Filtering", Proc.of SPIE vol. 7520, 2009.

Ryochi Matsuoka et al., "Integration of Mask and Silicon Metrology in DFM", Proc.of SPIE vol. 7275, 2009.

Ryochi Matsuoka et al., "New method of Contour based mask shape compiler", Proc.of SPIE vol. 6730, 2007.

* cited by examiner

PATTERN RECOGNITION WITH EDGE CORRECTION FOR DESIGN BASED METROLOGY

CROSS REFERENCE TO RELATED APPLICATIONS

This application is a Continuation-In-Part of U.S. patent application Ser. No. 12/914,154, filed Oct. 28, 2010, the disclosure of which is incorporated by reference herein in its entirety.

BACKGROUND

The present invention relates to Design Based Metrology (DBM), and more specifically, to systems and methods for providing pattern recognition and edge correction in DBM that provides increased efficiency in locating devices on semiconductor wafers.

In semiconductor fabrication, routine measurements are made of critical devices or features throughout the manufacturing process flow. Critical Dimension Scanning Electron Microscopy (CD-SEM) is typically implemented to measure these features on the wafer since it is fast and relatively non-destructive. Measurement of such structures requires the ability of the CD-SEM to locate the general area of the structure(s) of interest, and also to recognize the structures on the wafer. As such, the devices are located based on the design layout. However, often times, the fabricated wafer differs considerably from the design layout due largely to the structural differences between the design layout and an actual fabricated device, and this can pose challenges for the automatic pattern recognition routine. DBM is one of the key enablers for Optical Proximity Correction (OPC)/process modeling to collect tens of thousands of wafer CD data. DBM also provides an alternative wafer-less route for metrology recipe creation to save time and engineering resources in producing in-line measurement recipes for development and manufacturing. Like manual recipes, DBM recipe measurement includes two steps. First, Pattern Recognition (PR) is implemented, in which wafer images are compared with given/stored images in order to register wafer location; in manual recipes these images are collected from wafers and stored in a database, and in DBM recipes they are simply small sections of design files stored in the same database. If PR is successful in registering the location, the second step is shifting from PR location by a prescribed offset to go to the target location (e.g., a device on which to render measurements) and measure CD at given edges. If PR fails, measurement also fails. As described herein, for DBM, the design layout provides the needed information for locating and measuring the devices. However, DBM recipes suffer low success rate when wafer image is significantly different from layout typically resulting in the inability to make a measurement.

SUMMARY

Exemplary embodiments include a method for edge correction in pattern recognition, the method including generating, in a processor, a pattern recognition output for a pattern recognition process, including receiving, in the processor, a design layout, receiving, in the processor, a sample plan based on the design layout, receiving, in the processor, a first user-generated edge input, generating, in the processor, a pattern recognition recipe output from the design layout, the sample plan and the user-generated edge input, wherein the pattern recognition recipe output is configured to drive the pattern recognition process, generating, in the processor, a measurement model from the pattern recognition process, generating, in the processor, a measurement model pattern recognition output for an measurement model pattern recognition process, including receiving, in the processor, a second user-generated input and generating, in the processor, a measurement model pattern recognition recipe output from the measurement model and the second user-generated edge input, wherein the measurement model pattern recognition recipe output configured to drive the measurement model pattern recognition process.

Additional exemplary embodiments include a computer program product for providing edge correction for pattern recognition, the computer program product including a non-transitory computer readable medium having instructions for causing a computer to implement a method. The method includes generating a pattern recognition output for a pattern recognition process, including receiving a design layout, receiving a sample plan based on the design layout, receiving a first user-generated edge input, generating a pattern recognition recipe output from the design layout, the sample plan and the user-generated edge input, wherein the pattern recognition recipe output is configured to drive the pattern recognition process, generating a measurement model from the pattern recognition process, generating a measurement model pattern recognition output for an measurement model pattern recognition process, including receiving a second user-generated input and generating a measurement model pattern recognition recipe output from the measurement model and the second user-generated edge input, wherein the measurement model pattern recognition recipe output configured to drive the measurement model pattern recognition process.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
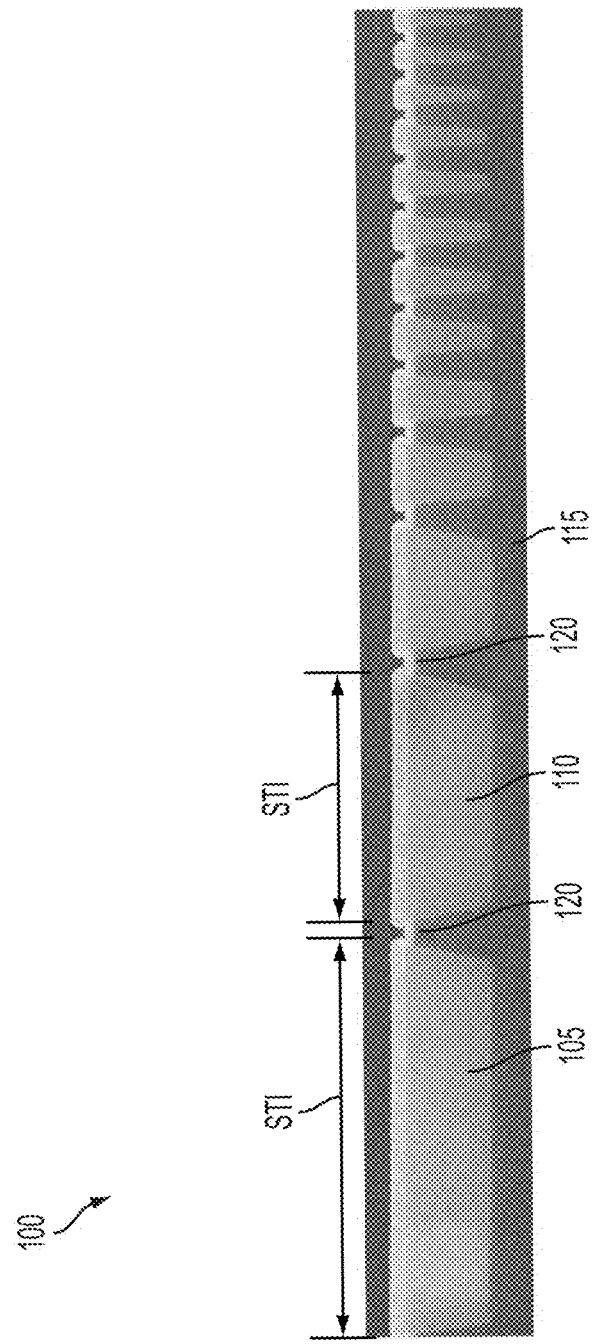
FIG. 1 illustrates in an SEM cross-section STI distance of respective device patterns.

In exemplary embodiments, the systems and methods described herein provide user-input for edge profiles in design layouts, which can substantially improve PR where CD measurements are made. As such, the systems and methods described herein not only implement layout information but also implement user-provided input to modify the layout to better mimic the wafer image, so that PR can be more accurate and successful. As described herein DBM automatically generates thousands of CD-SEM measurement recipes using information from design layout, and without requiring a CD-SEM tool and wafer. Any CD measurement, manual or by DBM, first performs a PR to register the wafer location, so the CD-SEM tool can then navigate to the correct measurement location from the PR location. The PR compares the structure it measures on the wafer with its stored image, and for DBM, the stored image is a clip from design layout.

The PR process/engine is based on recognition of structural device edges on wafers, which from a design layout are effectively lines with zero width. However on an actual wafer, while some edges can come close to an effective zero width, many edges vary in widths which can confuse the PR engine resulting in faulty recognition. In exemplary embodiments, multiple lines can be added to existing lines in the design layout to mimic a wider edge on a wafer to successfully direct the PR process to recognize a structural edge. In exemplary embodiments, the number and placement of the lines can be determined based on the width of a particular edge, which can be a function of pattern density of the edges. As such, measurements can be made of multiple devices on a wafer to determine the pattern density of edges of the devices and an interpolation of the number and placement of secondary lines can be made based on a measured width of an edge. In other exemplary embodiments, the systems and methods described herein can also be implemented for resist patterns that have large Bright Band (BB), to improve pattern uniqueness and PR success rate, where BB is a SEM artifact resulting from, for example, particularly sloped photoresist sidewall. In other exemplary embodiments, etched metal features with sidewall profiles can be measured with greater accuracy in accordance with exemplary embodiments.

As described herein conventional PR engines are based on recognition of edges. Although there are many conventional PR engines available, the exemplary systems and methods described herein can be implemented with conventional PR engines without detail of the specific PR algorithms. In exemplary embodiments, the systems and methods described herein can generate secondary edges based on pattern density and/or pitch of the actual edges on the wafer. For example, the secondary edges can be generated by predefining an offset table at two extremes of line density, isolated and dense, and interpolating to find offsets for intermediate density. The secondary lines can then be input by the user into the DBM generation system, and the modified layout can be generated for the PR engine.

In exemplary embodiments, the location of the secondary lines can be determined by a variety of methods. Regardless of the choice of location of the secondary lines, it is appreciated that the presence of the secondary lines increases PR accuracy. In exemplary embodiments, edge width (i.e. the distance between the primary line from the design layout and a secondary line) can be a function of Shallow Trench Isolation (STI) space, where the "active area," is the area of silicon that defines the active devices. The active areas are separated by the "shallow trenches" (STI) of silicon dioxide The STI space also defines the distance between devices. For example, the bigger the STI space, the larger the edge width, as illustrated in FIG. 1 that illustrates an SEM image of an STI distance 100 of respective device patterns 120, on bulk silicon 115 separated by trenches 105 and 110. Such a pattern can be implemented for measurements to obtain accurate data for setting the secondary lines. As such, in exemplary embodiments, when adding lines to the design layout, the user can use the design layout line as a starting point and move out a distance based on the STI space to place a secondary line. Then the distance from the secondary edge to primary edge can be calculated by either 1) a portion of the STI space, the ratio is a user input, or 2) a look-up table that user inputs from measurements. It is appreciated that in other exemplary embodiments, the choice of where and how to place secondary lines can be determined with a variety of desirable methods. As such, the exemplary embodiments described herein are not limited to the active layer. Any level with a significant edge width that can be measured, including but not limited to tapered resist.

Figure 2:
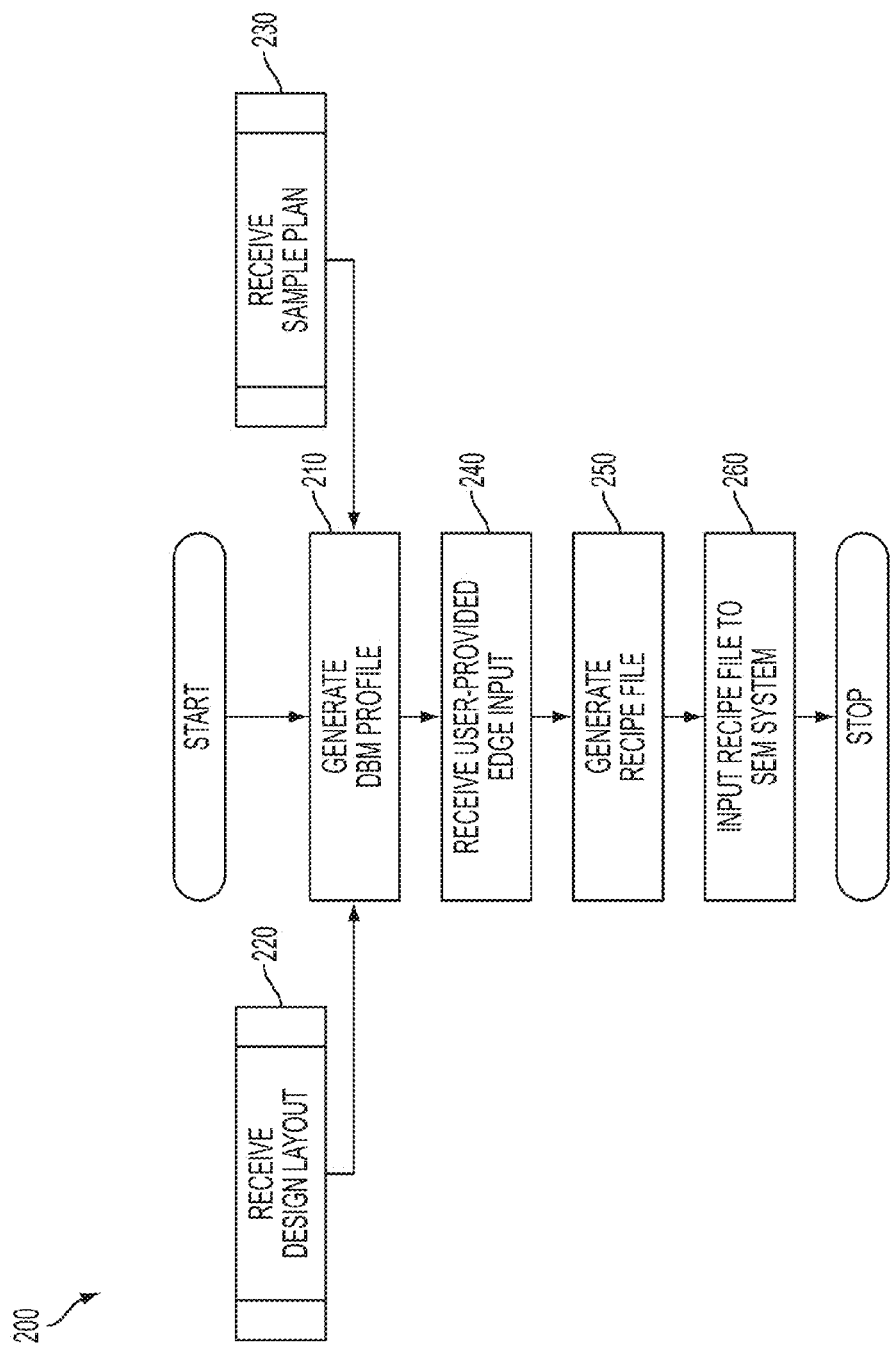
FIG. 2 illustrates a flow chart of a method for generating DBM recipe with edge correction in accordance with exemplary embodiments.

FIG. 2 illustrates a flow chart of a method 200 for performing PR with edge correction in accordance with exemplary embodiments. At block 210, the method 200 first generates a DBM profile for a DBM system as known in the art. The DBM profile is generated with a design layout at block 220 and a sample plan at block 230 as inputs. The DBM profile can be a .dbm file, and the design layout file can be a .gds file, both files as known in the art. At block 240, the method receives the user-provided edge input as selected and placed described herein. At block 250, a recipe file (e.g., a CAD .xml file) is generated for a PR system as described herein and known in the art. At block 260, the recipe file is input to the SEM system for pattern recognition of edges.

EXAMPLE

As described herein, PR is a first step in CD-SEM measurement. A high PR score is desirable so that correct and accurate measurement locations are registered. As described herein PR for DBM implements unique patterns from designs to compare to wafer images. Practical considerations can cause PR to fail such as significant etch profiles, which can be density dependent, and not known or anticipated in design layouts. As such, in DBM, the PR site is selected from the design layout "as is". As such, the exemplary embodiments described herein modify the design layouts with the exemplary secondary lines, several example which are now discussed. In the examples, the secondary lines are selected from etched profiles.

In the examples, PR images are illustrated on etched bulk silicon wafers, in which the active area pattern has been defined. Because of the slightly isotropic etch, the edge profile image on wafer is substantially different than layout input, causing PR failure. Even if the PR score can pass a certain threshold, it could easily introduce registration error by a few tens of nanometers, which is enough to result in a wrong or failed measurement in the second step of measurement as described herein. In the examples, a second set of edges are manually added to the design layout as described herein and compared the PR scores with and without the secondary lines. From the results, the primary PR score often doubled, and the second PR score, which is the possibility of finding a second (false) pattern that matches input, remained the same (low). As such, the user-provided lines generate pattern uniqueness that improves PR.

Figure 3C:
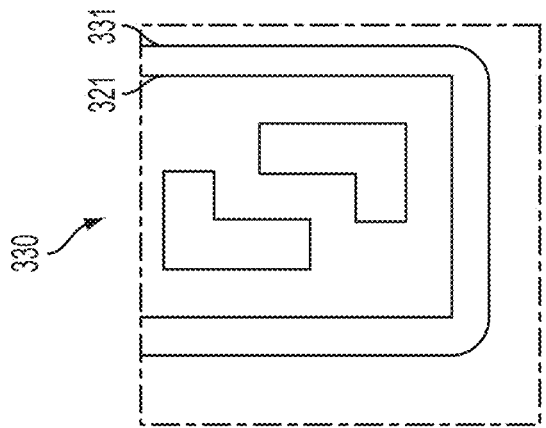
FIGS. 3A-6C illustrate actual examples of SEM images wafer devices compared to the same devices in design layouts and user-modified designs in accordance with exemplary embodiments.
Figure 3B:
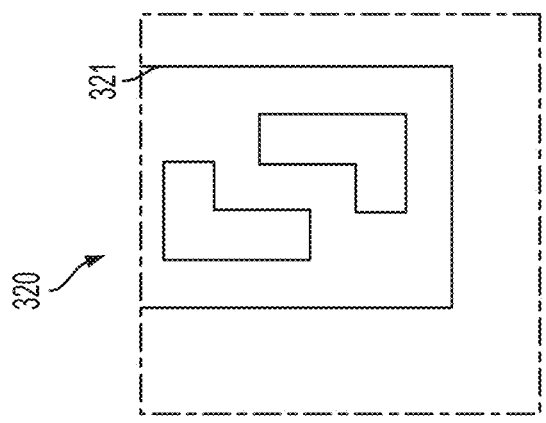
Figure 3A:
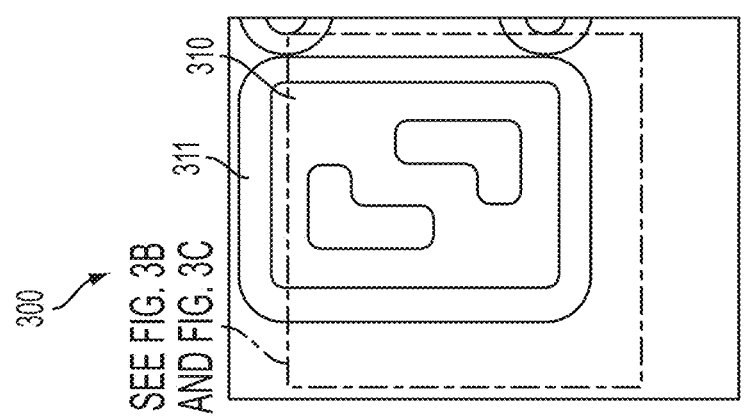

FIGS. 3A-3C illustrate an example of a CD-SEM PR image 300, a PR image on a unique pattern 310 in FIG. 3A compared to the same pattern in a design layout 320 in FIG. 3B and a user-modified design 330 in FIG. 3C. As illustrated, the design layout 320 includes a line 321 of effectively zero width for purposes of PR measurements. The actual wafer pattern 310 has a relatively wider edge 311 from etch process.

As such, as described herein, a user-provided secondary edge 331 is added in the user-modified design 330 in accordance with exemplary embodiments, the user-modified design including the line 321 from the design layout 320. In this example, the main PR score increased from 39 to 69, resulting in better registration accuracy, and the second PR score from 16 to 13, with less possibility to PR on a wrong location.

Figure 4C:
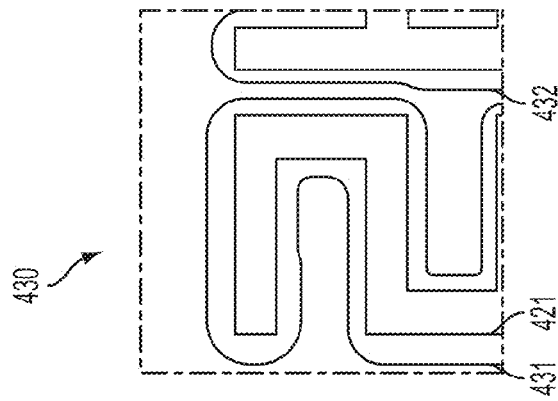
Figure 4B:
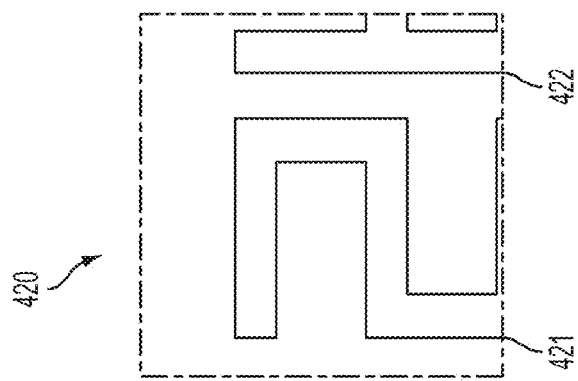
Figure 4A:
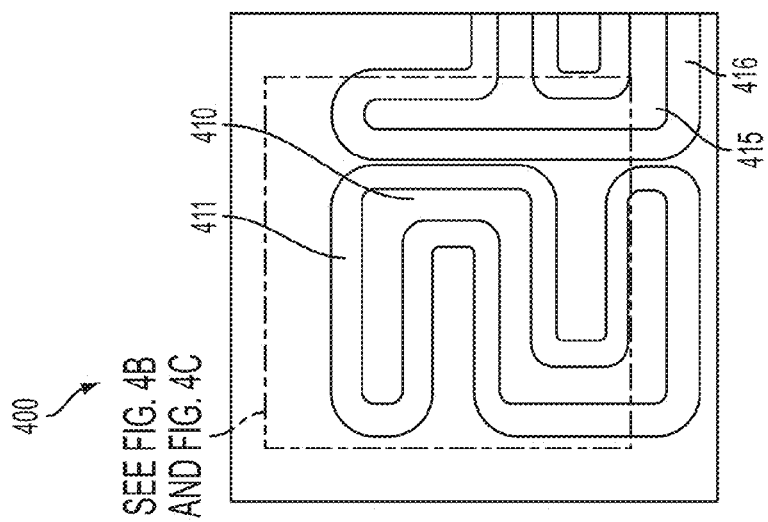

FIGS. 4A-4C illustrate another example of a CD-SEM image 400 of actual wafer patterns 410, 415 in FIG. 4A compared to the same pattern in a design layout 420 in FIG. 4B and a user-modified design 430 in FIG. 4C. In this example, two patterns devices 410, 415 are modified in the user-modified design 430. As illustrated, the design layout 420 includes lines 421, 422 of effectively zero width for purposes of PR measurements. The actual wafer patterns 410, 415 have relatively wider edges 411, 416, respectively arising from the etch process. As such, as described herein, user-provided secondary edges 431, 432 are added in the user-modified design 430 in accordance with exemplary embodiments, the user-modified design including the lines 421, 422 from the design layout 420. In this example, the main PR score increased from 41 to 86, resulting in better registration accuracy, and the second PR score from 30 to 37, with less possibility to PR on a wrong location.

Figure 5C:
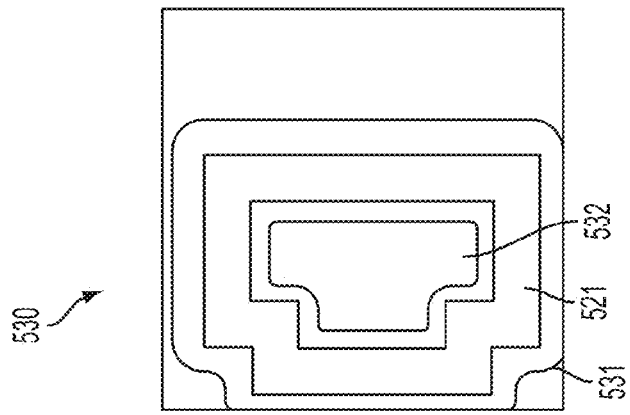
Figure 5B:
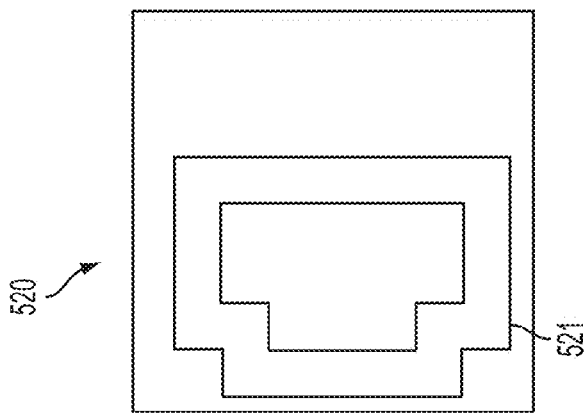
Figure 5A:
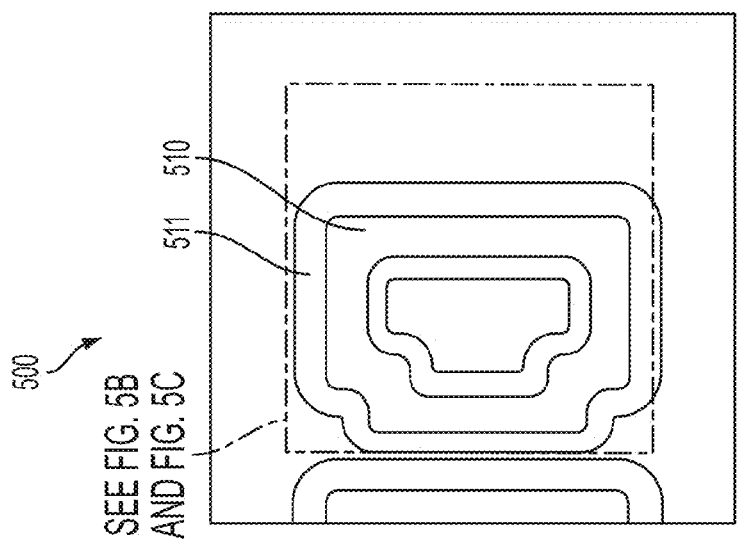

FIGS. 5A-5C illustrate another example of a CD-SEM image 500 of an actual wafer device 510 in FIG. 5A compared to the same device in a design layout 520 in FIG. 5B and a user-modified design 530 in FIG. 5C. As illustrated, the design layout 520 includes a line 521 of effectively zero width for purposes of PR measurements. The actual wafer device 510 has a relatively wider edge 511 from the etch. As such, as described herein, user-provided secondary edges 531, 532 are added in the user-modified design 530 in accordance with exemplary embodiments, the user-modified design including the line 521 from the design layout 520. This example illustrates an implementation of two secondary edges 531, 532 for a single device. In this example, the main PR score increased from 47 to 87, resulting in better registration accuracy, and the second PR score from 29 to 0, with less possibility to PR on a wrong location.

Figure 6C:
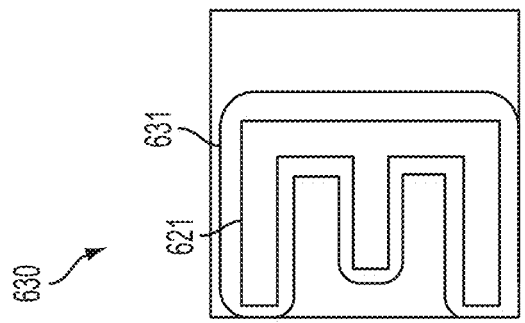
Figure 6B:
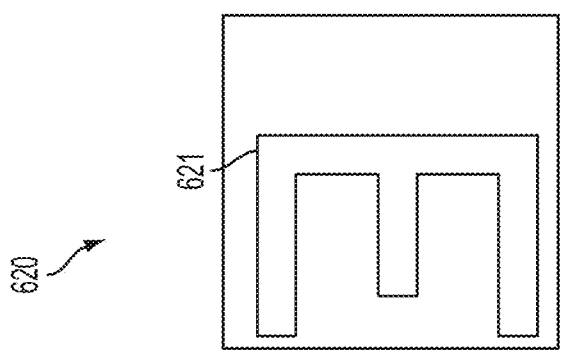
Figure 6A:
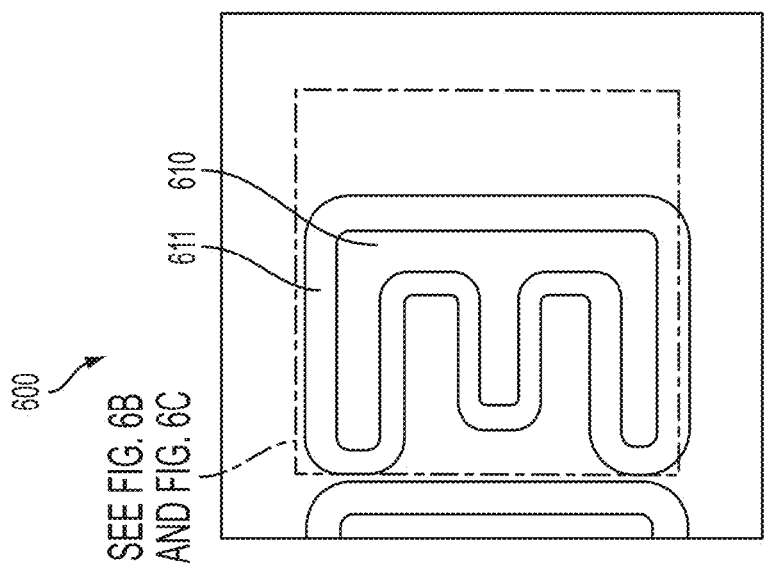

FIGS. 6A-6C illustrate another example of a CD-SEM image 600 an actual wafer device 610 in FIG. 6A compared to the same device in a design layout 620 in FIG. 6B and a user-modified design 630 in FIG. 6C. As illustrated, the design layout 620 includes a line 621 of effectively zero width for purposes of PR measurements. The actual wafer device 610 has a relatively wider edge 611 from the etch. As such, as described herein, a user-provided secondary edge 631 is added in the user-modified design 630 in accordance with exemplary embodiments, the user-modified design including the line 621 from the design layout 620. In this example, the main PR score increased from 40 to 85, resulting in better registration accuracy, and the second PR score from 0 to 37, with less possibility to PR on a wrong location.

In exemplary embodiments, the systems and methods described herein modify the design layouts, adding user-provided edge input to the design layouts to improve subsequent PR steps. In exemplary embodiments, the user-provided edge input are secondary lines added to original lines in the design layout. PR is then performed at the user-modified locations of the actual devices on a wafer, for example. Once PR is performed, subsequent CD-SEM measurements can be performed. As such, it can be appreciated that after PR is performed, a measurement model (MM) is generated from which the CD-SEM measurements can be performed. In exemplary embodiments, the MM can then be implemented as a basis for a second PR step, that is, a MMPR step to perform PR at the actual measurement location. Furthermore, additional user-provided edge input can be provided at the measurement location by adding more user-provided lines related to the device edges into the MM. The user provided lines in the design model are referred to as secondary lines as described herein. The user provided lines in the MM are referred to as MM lines. By performing the MMPR at the actual measurement location, measurement accuracy can be further improved for CD-SEM measurements. It can further be appreciated that implementing the MMPR step can be for both 1D and 2D measurements in DBM systems.

Figure 7:
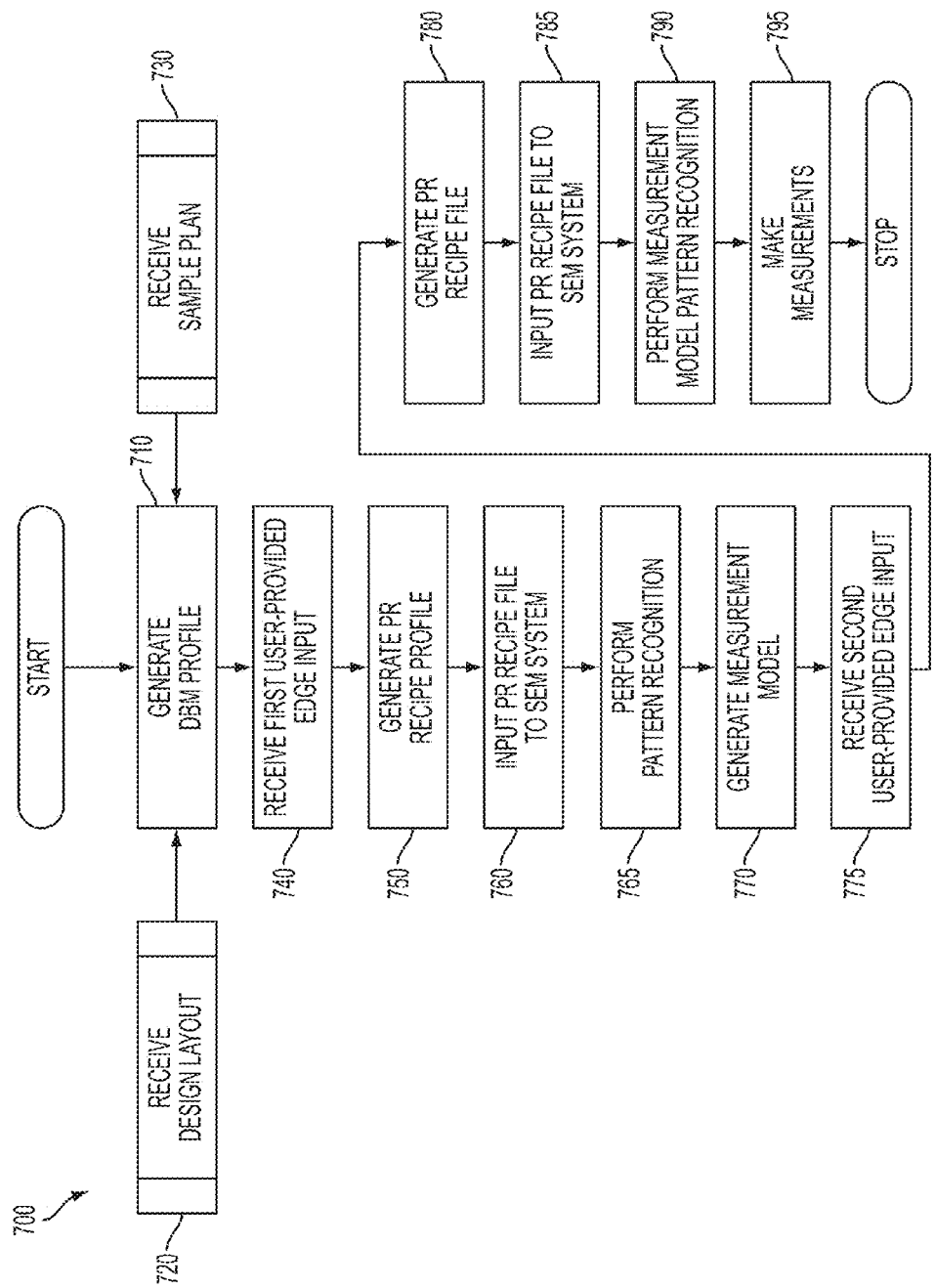
FIG. 7 illustrates a flow chart of a method for generating DBM recipe with edge correction in accordance with exemplary embodiments.

FIG. 7 illustrates a flow chart of a method 700 for performing PR with edge correction in accordance with exemplary embodiments. At block 710, the method 700 first generates a DBM profile for a DBM system as known in the art. The DBM profile is generated with a design layout at block 720 and a sample plan at block 730 as inputs. The DBM profile can be a .dbm file, and the design layout file can be a .gds file, both files as known in the art. At block 740, the method receives a first user-provided edge input as selected and placed described herein. In exemplary embodiments, as described herein, the user-provided edge input can be secondary lines that are added to the original design layout. At block 750, a PR recipe file (e.g., a CAD .xml file) is generated for a PR system as described herein and known in the art. At block 760, the PR recipe file is input to the SEM system for pattern recognition of edges. As such, at step 765, PR is performed as described herein. PR improves accuracy of any subsequent measurements (e.g., CD-SEM) that can be performed at this point. The results of the PR process are then used to generate a MM. Therefore, an MM can be generated at step 770. However, as described herein, the MM can also be modified with additional user-provided edge input to perform an additional PR step to further improve any subsequent measurements (e.g., the CD-SEM). At step 775, the method receives a second user-provided edge input as selected and placed described herein. In exemplary embodiments, as described herein, the user-provided edge input can be MM lines that are added to the original MM to generate an MMPR recipe output for the MMPR at block 780. At block 785, the MMPR recipe file is input to the SEM system for the MMPR of the edges at the previous PR measurement location. At block 790, MMPR is performed as described herein. The large edge profile due to, for example but may not be limited to, etched silicon or etched metal or thick resist, can affect the PR process for DBM, as the edge on wafer is significantly different from design input information. As such, the additional MMPR process directly affects the measurement location and thus measurement success rate. At block 795, the subsequent measurements can then be made with improved accuracy. It can be appreciated that since the method 700 can directly affect measurements, some settings at the measurement steps can be need be adjusted, including but not limited to edge pair.

The PR with edge correction methods described herein can be implemented on any suitable computing system that can generate and process the files and recipes described herein, as now described.

Figure 8:
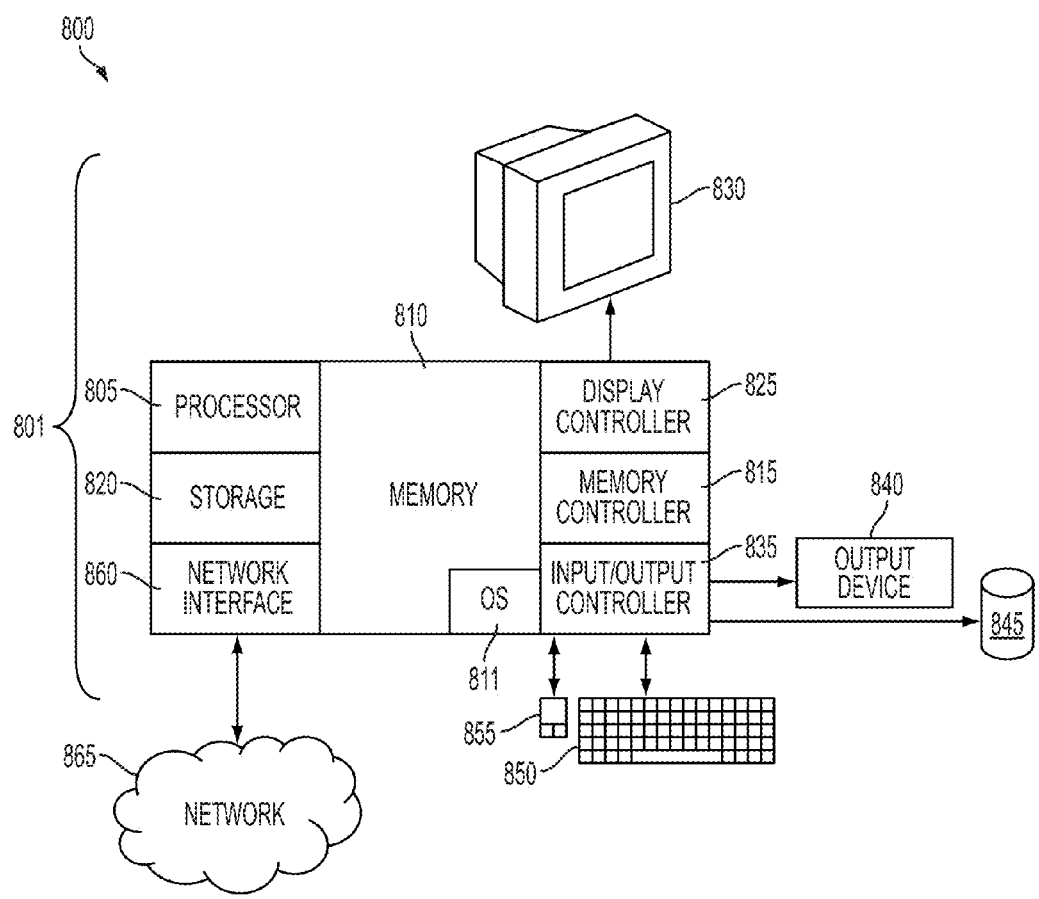
FIG. 8 illustrates an exemplary embodiment of a system for performing PR with edge correction.

FIG. 8 illustrates an exemplary embodiment of a system 800 for performing PR with edge correction. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 800 therefore includes general-purpose computer 801.

In exemplary embodiments, in terms of hardware architecture, as shown in FIG. 8, the computer 801 includes a processor 805, memory 810 coupled to a memory controller 815, and one or more input and/or output (I/O) devices 840, 845 (or peripherals) that are communicatively coupled via a local input/output controller 835. The input/output controller 835 can be, but is not limited to, one or more buses or other wired or wireless connections, as is known in the art. The input/output controller 835 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 805 is a hardware device for executing software, particularly that stored in memory 810. The processor 805 can be any custom made or commercially available processor, a Central Processing Unit (CPU), an auxiliary processor among several processors associated with the computer 801, a semiconductor based microprocessor (in the form of a microchip or chip set), a macroprocessor, or generally any device for executing software instructions.

The memory 810 can include any one or combination of volatile memory elements (e.g., Random Access Memory (RAM, such as DRAM, SRAM, SDRAM, etc.)) and nonvolatile memory elements (e.g., ROM, erasable programmable read only memory (EPROM), Electronically Erasable Programmable Read Only Memory (EEPROM), Programmable Read Only Memory (PROM), tape, Compact Disc Read Only Memory (CD-ROM), disk, diskette, cartridge, cassette or the like, etc.). Moreover, the memory 810 may incorporate electronic, magnetic, optical, and/or other types of storage media. Note that the memory 810 can have a distributed architecture, where various components are situated remote from one another, but can be accessed by the processor 805.

The software in memory 810 may include one or more separate programs, each of which comprises an ordered listing of executable instructions for implementing logical functions. In the example of FIG. 8, the software in the memory 810 includes the edge correction methods described herein in accordance with exemplary embodiments and a suitable operating system (OS) 811. The operating system 811 essentially controls the execution of other computer programs, such the edge correction systems and methods as described herein, and provides scheduling, input-output control, file and data management, memory management, and communication control and related services.

The edge correction methods described herein may be in the form of a source program, executable program (object code), script, or any other entity comprising a set of instructions to be performed. When a source program, then the program needs to be translated via a compiler, assembler, interpreter, or the like, which may or may not be included within the memory 810, so as to operate properly in connection with the OS 811. Furthermore, the edge correction methods can be written as an object oriented programming language, which has classes of data and methods, or a procedure programming language, which has routines, subroutines, and/or functions.

In exemplary embodiments, a conventional keyboard 850 and mouse 855 can be coupled to the input/output controller 835. Other output devices such as the I/O devices 840, 845 may include input devices, for example but not limited to a printer, a scanner, microphone, and the like. Finally, the I/O devices 840, 845 may further include devices that communicate both inputs and outputs, for instance but not limited to, a Network Interface Card (NIC) or modulator/demodulator (for accessing other files, devices, systems, or a network), a Radio Frequency (RF) or other transceiver, a telephonic interface, a bridge, a router, and the like. The system 800 can further include a display controller 825 coupled to a display 830. In exemplary embodiments, the system 800 can further include a network interface 860 for coupling to a network 865. The network 865 can be an IP-based network for communication between the computer 801 and any external server, client and the like via a broadband connection. The network 865 transmits and receives data between the computer 801 and external systems. In exemplary embodiments, network 865 can be a managed IP network administered by a service provider. The network 865 may be implemented in a wireless fashion, e.g., using wireless protocols and technologies, such as WiFi, WiMax, etc. The network 865 can also be a packet-switched network such as a local area network, wide area network, metropolitan area network, Internet network, or other similar type of network environment. The network 865 may be a fixed wireless network, a wireless Local Area Network (LAN), a wireless Wide Area Network (WAN) a Personal Area Network (PAN), a Virtual Private Network (VPN), intranet or other suitable network system and includes equipment for receiving and transmitting signals.

If the computer 801 is a PC, workstation, intelligent device or the like, the software in the memory 810 may further include a Basic Input Output System (BIOS) (omitted for simplicity). The BIOS is a set of essential software routines that initialize and test hardware at startup, start the OS 811, and support the transfer of data among the hardware devices. The BIOS is stored in ROM so that the BIOS can be executed when the computer 801 is activated.

When the computer 801 is in operation, the processor 805 is configured to execute software stored within the memory 810, to communicate data to and from the memory 810, and to generally control operations of the computer 801 pursuant to the software. The edge correction methods described herein and the OS 811, in whole or in part, but typically the latter, are read by the processor 805, perhaps buffered within the processor 805, and then executed.

When the systems and methods described herein are implemented in software, as is shown in FIG. 8, the methods can be stored on any computer readable medium, such as storage 820, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the edge correction methods are implemented in hardware, the edge correction methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Technical effects include significant improvements in PR scores thereby resulting in better pattern registration and therefore measurement, and reducing or eliminating low PR success or failed measurements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for edge correction in pattern recognition for critical dimension scanning electron microscopy, the method comprising:
    generating, in a processor, a pattern recognition (PR) output for a PR process, including:
        receiving, in the processor, a design layout, which includes a plurality of devices having a plurality of edges;
        receiving, in the processor, a sample plan based on the design layout;
        receiving, in the processor, a first user-generated edge input, which includes a plurality of secondary lines that are placed adjacent the plurality of edges to mimic wider edges present in a plurality of actual devices, the plurality of secondary lines generated via an offset table defining two extremes of line density of each of the plurality of edges, the two extremes being isolated and dense;
    interpolating, in the processor, the two extremes to determine offsets for an intermediate density of lines for each of the plurality of edges;
        generating, in the processor, a PR recipe output from the design layout, the sample plan and the user-generated edge input, wherein the PR recipe output is configured to drive the PR process;
        generating, in the processor, a measurement model (MM) from the PR process;
    generating, in the processor, a measurement model pattern recognition (MMPR) output for an MMPR process, including:
        receiving, in the processor, a second user-generated input; and
        generating, in the processor, a MMPR recipe output from the MM and the second user-generated edge input, wherein the MMPR recipe output configured to drive the MMPR process.

2. The method as claimed in claim 1 further comprising generating, in the processor, a design based metrology (DBM) profile.

3. The method as claimed in claim 2 wherein the design layout and the sample plan are input into the DBM profile to generate lines for PR.

4. The method as claimed in claim 3 wherein the first user-generated edge input modifies the lines in the design layout for PR.

5. The method as claimed in claim 1 wherein the PR recipe output is generated for a scanning electron microscope.

6. The method as claimed in claim 5 wherein actual device edges measured from the SEM are compared to lines in the design layout.

7. The method as claimed in claim 6 wherein the lines in the design layout are modified from the first user-generated edge input.

8. The method as claimed in claim 7 wherein the user-generated edge input is generated based on at least one of a pitch and density of edges in the design layout.

9. The method as claimed in claim 1 wherein the second user-generated input is input into the MM to generate MM lines for MMPR.

10. The method as claimed in claim 9 wherein the second user-generated edge input modifies the lines in the MM for MMPR.

11. A computer program product for providing edge correction for pattern recognition for critical dimension scanning electron microscopy, the computer program product including a non-transitory computer readable medium having instructions for causing a computer to implement a method, the method comprising:
    generating, in a processor, a pattern recognition (PR) output for a PR process, including:
        receiving a design layout, which includes a plurality of devices having a plurality of edges;
        receiving a sample plan based on the design layout;
        receiving a first user-generated edge input, which includes a plurality of secondary lines that are placed adjacent the plurality of edges to mimic wider edges present in a plurality of actual devices, the plurality of secondary lines generated via an offset table defining two extremes of line density of each of the plurality of edges, the two extremes being isolated and dense;
        interpolating the two extremes to determine offsets for an intermediate density of lines for each of the plurality of edges;
        generating a PR recipe output from the design layout, the sample plan and the user-generated edge input, wherein the PR recipe output is configured to drive the PR process;
        generating a measurement model (MM) from the PR process;
    generating a measurement model pattern recognition (MMPR) output for an MMPR process, including:
        receiving a second user-generated input; and
        generating a MMPR recipe output from the MM and the second user-generated edge input, wherein the MMPR recipe output configured to drive the MMPR process.

12. The computer program product as claimed in claim 11 wherein the method further comprises generating a design based metrology (DBM) profile.

13. The computer program product as claimed in claim 12 wherein the design layout and the sample plan are input into the DBM profile to generate lines for PR.

14. The computer program product as claimed in claim 13 wherein the first user-generated edge input modifies the lines in the design layout for PR.

15. The computer program product as claimed in claim 11 wherein the PR recipe output is generated for a scanning electron microscope.

16. The computer program product as claimed in claim 15 wherein actual device edges measured from the SEM are compared to lines in the design layout.

17. The computer program product as claimed in claim 6 wherein the lines in the design layout are modified from the first user-generated edge input.

18. The computer program product as claimed in claim 17 wherein the user-generated edge input is generated based on at least one of a pitch and density of edges in the design layout.

19. The computer program product as claimed in claim 11 wherein the second user-generated input is input into the MM to generate MM lines for MMPR.

20. The computer program product as claimed in claim 19 wherein the second user-generated edge input modifies the lines in the MM for MMPR.

* * * * *